US010533618B2

(12) United States Patent
Kimes

(10) Patent No.: US 10,533,618 B2
(45) Date of Patent: Jan. 14, 2020

(54) OVERRUNNING, NON-FRICTION COUPLING AND CONTROL ASSEMBLY, ENGAGEABLE COUPLING ASSEMBLY AND LOCKING MEMBER FOR USE IN THE ASSEMBLIES

(71) Applicant: Means Industries, Inc., Saginaw, MI (US)

(72) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 22 days.

(21) Appl. No.: 15/712,651

(22) Filed: Sep. 22, 2017

(65) Prior Publication Data

US 2018/0010651 A1 Jan. 11, 2018

Related U.S. Application Data

(63) Continuation-in-part of application No. 14/487,322, filed on Sep. 16, 2014, now Pat. No. 9,874,252, and a continuation-in-part of application No. 14/487,234, filed on Sep. 16, 2014, now Pat. No. 9,435,387.

(Continued)

(51) Int. Cl.
*F16D 41/12* (2006.01)
*F16H 63/30* (2006.01)
(Continued)

(52) U.S. Cl.
CPC ........... *F16D 41/125* (2013.01); *F16D 27/10* (2013.01); *F16D 41/16* (2013.01); *F16H 63/304* (2013.01)

(58) Field of Classification Search
CPC ........... F16H 63/304; F16H 2063/3053; F16H 3/006; F16H 2063/305; F16D 41/16;
(Continued)

(56) References Cited

U.S. PATENT DOCUMENTS 2,863,326 A 12/1958 Maurice et al.
2,866,109 A 12/1958 Watson
(Continued)

FOREIGN PATENT DOCUMENTS

GB 1007475 A 10/1965
JP 09196128 7/1997

OTHER PUBLICATIONS

International Search Report and Written Opinion, International application No. PCT/US2011/036636; dated Aug. 26, 2011.
(Continued)

*Primary Examiner* — Jacob S. Scott
*Assistant Examiner* — Lillian T Nguyen
(74) *Attorney, Agent, or Firm* — Brooks Kushman P.C.

(57) ABSTRACT

An overrunning, non-friction coupling and control assembly, an engageable coupling assembly and locking members for use in the assemblies are provided. A centroid or center of mass of at least one of the locking members is substantially centered on a pivot axis of the locking member so that the locking member is substantially centrifugally neutral or balanced thereby making the locking member easier to pivot between engaged and disengaged positions with respect to the coupling members of its corresponding assembly at high rotational speeds.

10 Claims, 6 Drawing Sheets

Related U.S. Application Data

(60) Provisional application No. 62/453,578, filed on Feb. 2, 2017, provisional application No. 61/882,694, filed on Sep. 26, 2013.

(51) Int. Cl.
*F16D 27/10* (2006.01)
*F16D 41/16* (2006.01)

(58) Field of Classification Search
CPC ........ F16D 27/10; F16D 11/14; F16D 27/118; F16D 27/004; F16D 23/0606; F16D 23/02; F16D 27/108; F16D 41/125; Y10T 74/19251
See application file for complete search history.

(56) References Cited

U.S. PATENT DOCUMENTS

| | | | |
|---|---|---|---|
| 2,947,537 A | 8/1960 | Littell et al. | |
| 2,959,062 A | 11/1960 | Looker | |
| 2,960,287 A | 11/1960 | Barlow | |
| 2,966,975 A | 1/1961 | Wiedmann et al. | |
| 2,969,134 A | 1/1961 | Wiedmann et al. | |
| 3,130,989 A | 4/1964 | Lannen | |
| 4,050,560 A | 9/1977 | Torstenfelt | |
| 4,340,133 A | 7/1982 | Blersch | |
| 4,651,847 A | 3/1987 | Hermanns | |
| 5,046,594 A | 9/1991 | Kakinuma | |
| 5,052,534 A | 10/1991 | Gustin et al. | |
| 5,070,978 A | 12/1991 | Pires | |
| 5,206,573 A | 4/1993 | McCleer et al. | |
| 5,231,265 A | 7/1993 | Hackett et al. | |
| 5,342,258 A | 8/1994 | Egyed | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,597,057 A | 1/1997 | Ruth et al. | |
| 5,638,929 A | 6/1997 | Park | |
| 5,642,009 A | 6/1997 | McCleer et al. | |
| 5,678,668 A | 10/1997 | Sink | |
| 5,827,148 A | 10/1998 | Seto et al. | |
| 5,846,257 A | 12/1998 | Hood | |
| 5,847,469 A | 12/1998 | Tabata et al. | |
| 5,856,709 A | 1/1999 | Ibaraki et al. | |
| 5,896,969 A * | 4/1999 | Meier-Burkamp | F16D 41/14 192/46 |
| 5,918,715 A | 7/1999 | Ruth et al. | |
| 5,924,510 A | 7/1999 | Itoh et al. | |
| 5,927,455 A | 7/1999 | Baker et al. | |
| 5,992,592 A | 11/1999 | Showalter | |
| 6,019,699 A | 2/2000 | Hoshiya et al. | |
| 6,065,576 A | 5/2000 | Shaw et al. | |
| 6,075,302 A | 6/2000 | McCleer | |
| 6,193,038 B1 | 2/2001 | Scott et al. | |
| 6,237,931 B1 | 5/2001 | Marola | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,328,670 B1 | 12/2001 | Minowa et al. | |
| 6,344,008 B1 | 2/2002 | Nagano et al. | |
| 6,503,167 B1 | 1/2003 | Sturm | |
| 6,692,405 B2 | 2/2004 | Minowa et al. | |
| RE38,498 E * | 4/2004 | Ruth | F16D 41/125 188/82.8 |
| 6,814,201 B2 | 11/2004 | Thomas | |
| 6,827,167 B2 | 12/2004 | Cikanek et al. | |
| 6,846,257 B2 | 1/2005 | Baker et al. | |
| 6,905,009 B2 | 6/2005 | Reed et al. | |
| 6,953,409 B2 | 10/2005 | Schmidt et al. | |
| 6,982,502 B1 | 1/2006 | Sendaula et al. | |
| 7,093,512 B2 | 8/2006 | Ibamoto et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,349,010 B2 | 3/2008 | Bryant et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,690,455 B2 | 4/2010 | Kano et al. | |
| 7,695,387 B2 | 4/2010 | Oba | |
| 7,743,678 B2 | 6/2010 | Wittkopp et al. | |
| 7,806,795 B2 | 10/2010 | Oba et al. | |
| 7,898,121 B2 | 3/2011 | Ramsay et al. | |
| 7,942,781 B2 | 5/2011 | Kimes | |
| 7,992,695 B2 | 8/2011 | Wittkopp et al. | |
| 8,006,819 B2 | 8/2011 | Dell et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 3,286,772 A1 | 10/2012 | Eisengruber | |
| 8,403,123 B2 | 3/2013 | Bird et al. | |
| 8,443,956 B2 | 5/2013 | Bauer et al. | |
| 8,813,929 B2 | 8/2014 | Kimes | |
| 8,888,637 B2 | 11/2014 | Kimes | |
| 9,109,636 B2 | 8/2015 | Kimes et al. | |
| 9,121,454 B2 | 9/2015 | Pawley | |
| 9,127,730 B2 | 9/2015 | Greene et al. | |
| 9,186,977 B2 | 11/2015 | Kimes | |
| 9,303,699 B2 | 4/2016 | Kimes et al. | |
| 9,435,387 B2 | 9/2016 | Kimes et al. | |
| 2002/0139631 A1 * | 10/2002 | Wang | F16D 41/30 192/64 |
| 2004/0110594 A1 | 6/2004 | Goto | |
| 2004/0159517 A1 | 8/2004 | Thomas | |
| 2004/0238306 A1 | 12/2004 | Reed et al. | |
| 2006/0138777 A1 | 6/2006 | Hofbauer et al. | |
| 2006/0185957 A1 | 8/2006 | Kimes et al. | |
| 2006/0252589 A1 | 11/2006 | Tay | |
| 2006/0278487 A1 | 12/2006 | Pawley et al. | |
| 2007/0034470 A1 | 2/2007 | Fetting, Jr. et al. | |
| 2007/0056825 A1 | 3/2007 | Fetting, Jr. et al. | |
| 2007/0107960 A1 | 5/2007 | Takami et al. | |
| 2007/0278061 A1 | 12/2007 | Wittkopp et al. | |
| 2007/0284208 A1 * | 12/2007 | Jackwerth | F16D 41/066 192/41 A |
| 2008/0093190 A1 | 4/2008 | Belmont | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2008/0245360 A1 | 10/2008 | Almy et al. | |
| 2008/0277891 A1 | 11/2008 | Adams, III et al. | |
| 2009/0084653 A1 | 4/2009 | Holmes | |
| 2009/0098968 A1 | 4/2009 | Maguire et al. | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0044141 A1 | 2/2010 | Kimes et al. | |
| 2010/0071497 A1 | 3/2010 | Reisch et al. | |
| 2010/0119389 A1 | 5/2010 | Lazebnik et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0011694 A1 | 1/2011 | Swales et al. | |

(56) References Cited

U.S. PATENT DOCUMENTS

| | | |
|---|---|---|
| 2011/0140451 A1 | 6/2011 | Sharples et al. |
| 2011/0177900 A1 | 7/2011 | Simon |
| 2011/0183806 A1 | 7/2011 | Wittkopp et al. |
| 2011/0192697 A1 | 8/2011 | Prout et al. |
| 2011/0215575 A1 | 9/2011 | Hofbauer et al. |
| 2011/0233026 A1 | 9/2011 | Pawley |
| 2012/0111687 A1* | 5/2012 | Peterson ............... F16D 41/12 192/46 |
| 2012/0145505 A1 | 6/2012 | Kimes |
| 2012/0145506 A1 | 6/2012 | Samie et al. |
| 2012/0152683 A1 | 6/2012 | Kimes |
| 2012/0152687 A1 | 6/2012 | Kimes et al. |
| 2014/0102844 A1 | 4/2014 | Greene et al. |
| 2014/0190785 A1 | 7/2014 | Fetting et al. |
| 2014/0284167 A1 | 9/2014 | Kimes |
| 2015/0014116 A1 | 1/2015 | Kimes et al. |
| 2016/0348741 A1 | 12/2016 | Niemiec et al. |
| 2017/0343061 A1 | 11/2017 | Campton |
| 2018/0347642 A1 | 12/2018 | Kimes |

OTHER PUBLICATIONS

International Search Report and Written Opinion, International application No. PCT/US2011/036634; dated Aug. 25, 2011.
International Search Report and Written Opinion, International application No. PCT/US2012/025046; dated May 21, 2012.
International Search Report and Written Opinion, International application No. PCT/US2012/050742; dated Nov. 20, 2012.
International Search Report and Written Opinion, International application No. PCT/US2012/50749; dated Dec. 11, 2012.
International Preliminary Report on Patentability; International application No. PCT/US2012/025046; dated Aug. 21, 2013.
International Preliminary Report on Patentability; International application No. PCT/US2012/050749; dated Mar. 4, 2014.
International Preliminary Report on Patentability; International application No. PCT/US2012/050742; dated Mar. 4, 2014.
International Preliminary Report on Patentability; International application No. PCT/US2012/050753; dated Mar. 25, 2014.
Office Action; U.S. Appl. No. 13/370,507; dated Aug. 27, 2014.
International Searching Authority, International Search Report and the Written Opinion for International Application No. PCT/US2018/12798 dated Apr. 4, 2018.
The International Bureau of WIPO, International Preliminary Report on Patentability dated Aug. 15, 2019 and Written Opinion of the International Searching Authority dated Apr. 4, 2018 for International Application No. PCT/US2018/012798.
United States Patent Office, Non-Final Office Action for U.S. Appl. No. 15/712,635, dated Oct. 25, 2019.

* cited by examiner

OVERRUNNING, NON-FRICTION COUPLING AND CONTROL ASSEMBLY, ENGAGEABLE COUPLING ASSEMBLY AND LOCKING MEMBER FOR USE IN THE ASSEMBLIES

CROSS-REFERENCE TO RELATED APPLICATIONS

This application claims the benefit of U.S. provisional application Ser. No. 62/453,578 filed Feb. 2, 2017; this application is a continuation-in-part of U.S. application Ser. No. 14/487,322 filed Sep. 18, 2014, which claims the benefit of U.S. provisional application Ser. No. 61/882,694 filed Sep. 26, 2013 and which is a continuation-in-part application of U.S. application Ser. No. 14/487,234 filed on Sep. 16, 2014, (now U.S. Pat. No. 9,435,387) which claims the benefit of U.S. provisional patent application Ser. No. 61/882,694 filed Sep. 26, 2013. Each of the above-noted applications filed in 2014 is hereby incorporated in its entirety by reference herein. This application is also related to U.S. patent application entitled "Overrunning, Non-Friction Coupling And Control Assemblies And Switchable Linear Actuator Device And Reciprocating Electromechanical Apparatus For Use Therein" filed on the same day as this application.

TECHNICAL FIELD

This invention relates to:

1) engageable non-friction coupling assemblies such as radial coupling assemblies;

2) overrunning, non-friction coupling and control assemblies such as radial coupling and control assemblies; and 3) locking members for controllably transmitting torque between coupling members of non-friction coupling assemblies such as radial coupling assemblies.

Overview

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 20009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0252589; 2006/0278487; 2006/0138777; 2006/0185957; 2004/0110594; and the following U.S. Pat. Nos. 7,942,781; 7,806,795; 7,695,387; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,638,929; 5,342,258; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,846,257; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open look operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

U.S. patent documents assigned to the same assignee as the present application and which are related to the present application include U.S. Pat. Nos. 8,813,929; 8,888,637; 9,109,636; 9,121,454, 9,186,977; 9,303,699; 9,435,387; and U.S. published applications 2012/0149518; 2013/0256078; 2013/0277164; 2014/0100071; and 2015/0014116. The disclosures of all of the above-noted, commonly assigned patent documents are hereby incorporated in their entirety by reference herein.

Some of the above related patent documents assigned to the assignee of the present application disclose a 2-position, linear motor eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442; 2016/0047439; and U.S. Pat. No. 9,441,708 disclose 3-position, linear motor, magnetically-latching, 2-way CMDs.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

A clevis fastener is a three-piece fastener system consisting of a clevis, clevis pin, and tang. The clevis is a U-shaped piece that has holes at the end of the prongs to accept the clevis pin. The clevis pin is similar to a bolt, but is only partially threaded or unthreaded with a cross-hole for a cotter pin. The tang is the piece that fits between the clevis and is held in place by the clevis pin. The combination of a simple clevis fitted with a pin is commonly called a shackle, although a clevis and pin is only one of the many forms a shackle may take.

Clevises are used in a wide variety of fasteners used in the farming equipment, sailboat rigging, as well as the automotive, aircraft and construction industries. They are also widely used to attach control surfaces and other accessories to servos in model aircraft. As a part of a fastener, a clevis provides a method of allowing rotation in some axes while restricting rotation in others.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

An object of at least one embodiment of the present invention is to provide an overrunning, non-friction coupling and control assembly, an engageable coupling assembly, and one or more locking members for use in such assemblies wherein at least one of the locking members is substantially centrifugally neutral or balanced thereby making the locking member easier to move at high rotational speeds.

In carrying out the above objects and other objects of at least one embodiment of the present invention, a locking member for controllably transmitting torque between first and second coupling members of a coupling assembly is provided. The first coupling member includes a coupling face having a pocket which is sized and shaped to receive and nominally retain the locking member. The locking member includes a member-engaging first end surface, a member-engaging second end surface and an elongated main body portion between the end surfaces. The main body portion is configured to enable pivotal motion of the locking member about a pivot axis. The end surfaces of the locking member are movable between engaged and disengaged positions with respect to the coupling members during the pivotal motion whereby one-way torque transfer may occur between the coupling members. A centroid of the locking member is substantially centered on the pivot axis so that the locking member is substantially centrifugally neutral or balanced.

The main body portion may include projecting upper and lower pivots to enable the pivotal motion.

The locking member maybe a radial locking member.

The pivot axis maybe located at substantially a midpoint between the end surfaces.

The main body portion may include an aperture centered about the centroid and adapted to receive a pivot pin to enable the pivotal motion. The first coupling member maybe adapted to be pivotally connected to the locking member via the pivot pin.

The aperture may be an oblong aperture to receive the pivot pin to allow both pivotal and translational motion of the locking member.

The locking member may further comprise a friction-reducing coating to reduce overall moment of the locking member about the pivot axis.

The locking member maybe an injection molded locking member such as a metal injection molded locking member.

Further in carrying out the above object and other objects of at least one embodiment of the present invention, an engageable coupling assembly comprising is provided. The assembly includes first and second coupling members. The first coupling member has a coupling face with a pocket which is sized and shaped to receive and nominally retain a locking member. The locking member includes a member-engaging first end surface, a member-engaging second end surface and an elongated main body portion between the end surfaces. The main body portion is configured to enable pivotal motion of the locking member about a pivot axis. The end surfaces of the locking member are movable between engaged and disengaged positions with respect to the coupling members during the pivotal motion whereby one-way torque transfer may occur between the coupling members. A centroid or center of mass of the locking member is substantially centered on the pivot axis so that the locking member is substantially centrifugally neutral or balanced, thereby reducing overall moment on the locking member about the pivot axis that has to be overcome to move the locking member between the engaged and disengaged positions.

The main body portion may include projecting upper and lower pivots to enable the pivotal motion.

The assembly may further include a pivot pin supported by the first coupling member in the pocket. The main body portion may include an aperture centered about the centroid and adapted to receive the pivot pin to enable the pivotal motion. The first coupling member may be adapted to be coupled to the locking member via the pivot pin.

The aperture may be an oblong aperture which receives the pivot pin to allow both pivotal and translational motion of the locking member.

The assembly may further comprise a friction-reducing coating to reduce overall moment on the locking member about the pivot axis.

Still further is carrying out the above object and other objects of at least one embodiment of the present invention, an overrunning coupling and control assembly is provided. The assembly includes first and second coupling members. The first coupling member has a first face with a pocket which is sized and shaped to receive and nominally retain a locking member and a second face having a passage in communication with the pocket to communicate an actuating force to the locking member to actuate the locking member within the pocket so that the locking member moves between engaged and disengaged positions. The locking member includes a member-engaging first end surface, a member-engaging second end surface and an elongated main body portion between the end surfaces. The main body portion is configured to enable pivotal motion of the locking member about a pivot axis. The end surfaces of the locking member are movable between engaged and disengaged positions with respect to the coupling members during the pivotal motion whereby one-way torque transfer may occur between the coupling members. A centroid of the locking member is substantially centered on the pivot axis so that the locking member is substantially centrifugally centered or balanced, thereby reducing overall moment on the locking member about the pivot axis that has to be overcome to move the locking member between the engaged and disengaged positions.

The main body portion may include projecting upper and lower pivots to enable the pivotal motion.

The assembly may further compromise a pivot pin supported by the first coupling member in the pocket. The main body portion may include an aperture centered about the centroid that receives the pivot pin to enable the pivotal motion.

The aperture maybe an oblong aperture which receives the pivot pin to allow both pivotal and translational motion of the locking member.

The assembly may further compromise a friction-reducing coating to reduce overall moment on the locking member about the pivot axis.

The assembly may further comprise an actuator received within the passage to provide the actuating force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
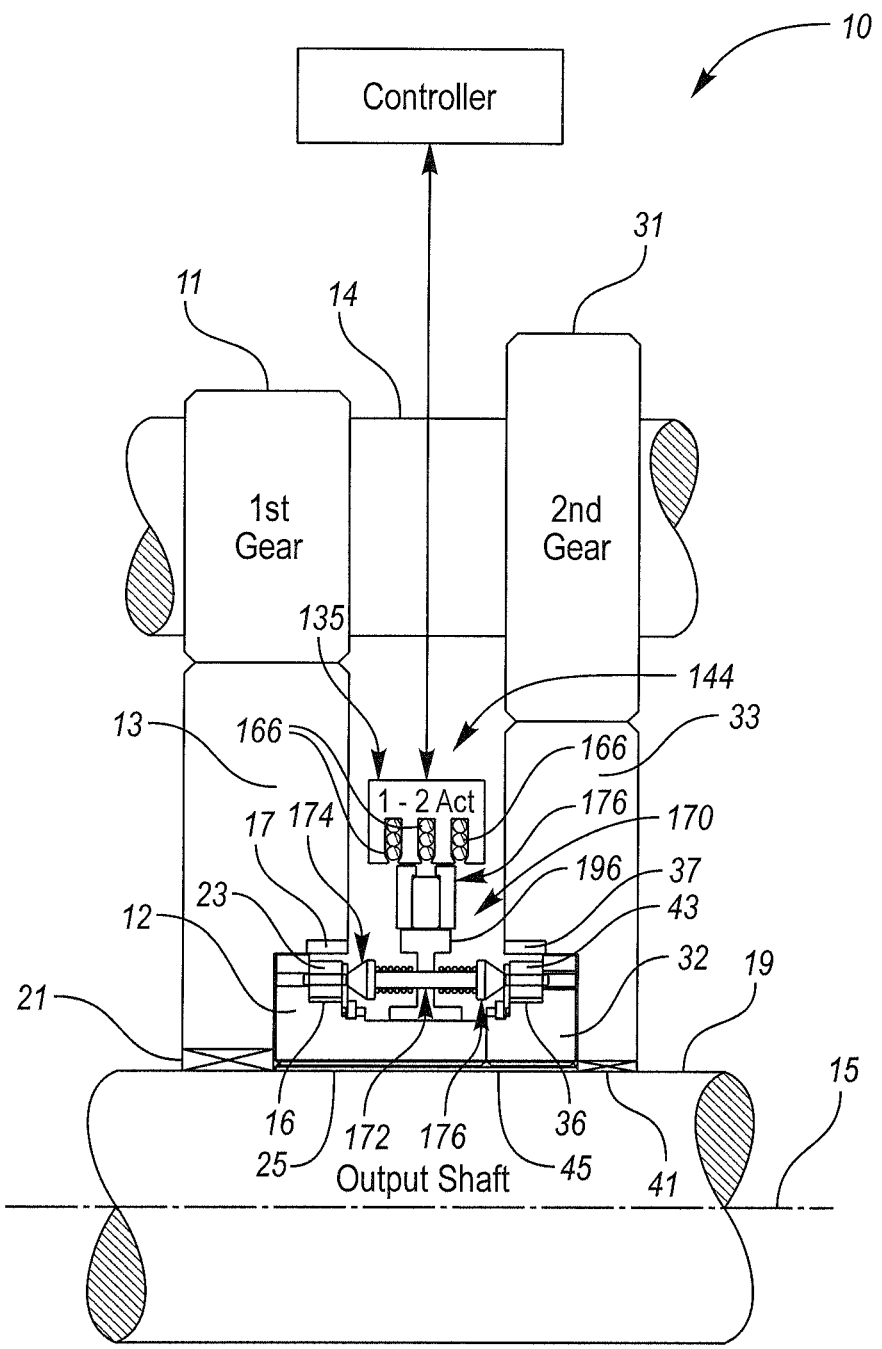
FIG. 1 is a schematic view, partially broken away of an overrunning, non-friction, radial coupling and control assembly for coupling torque between either first and second gears and an output shaft.
Figure 2:
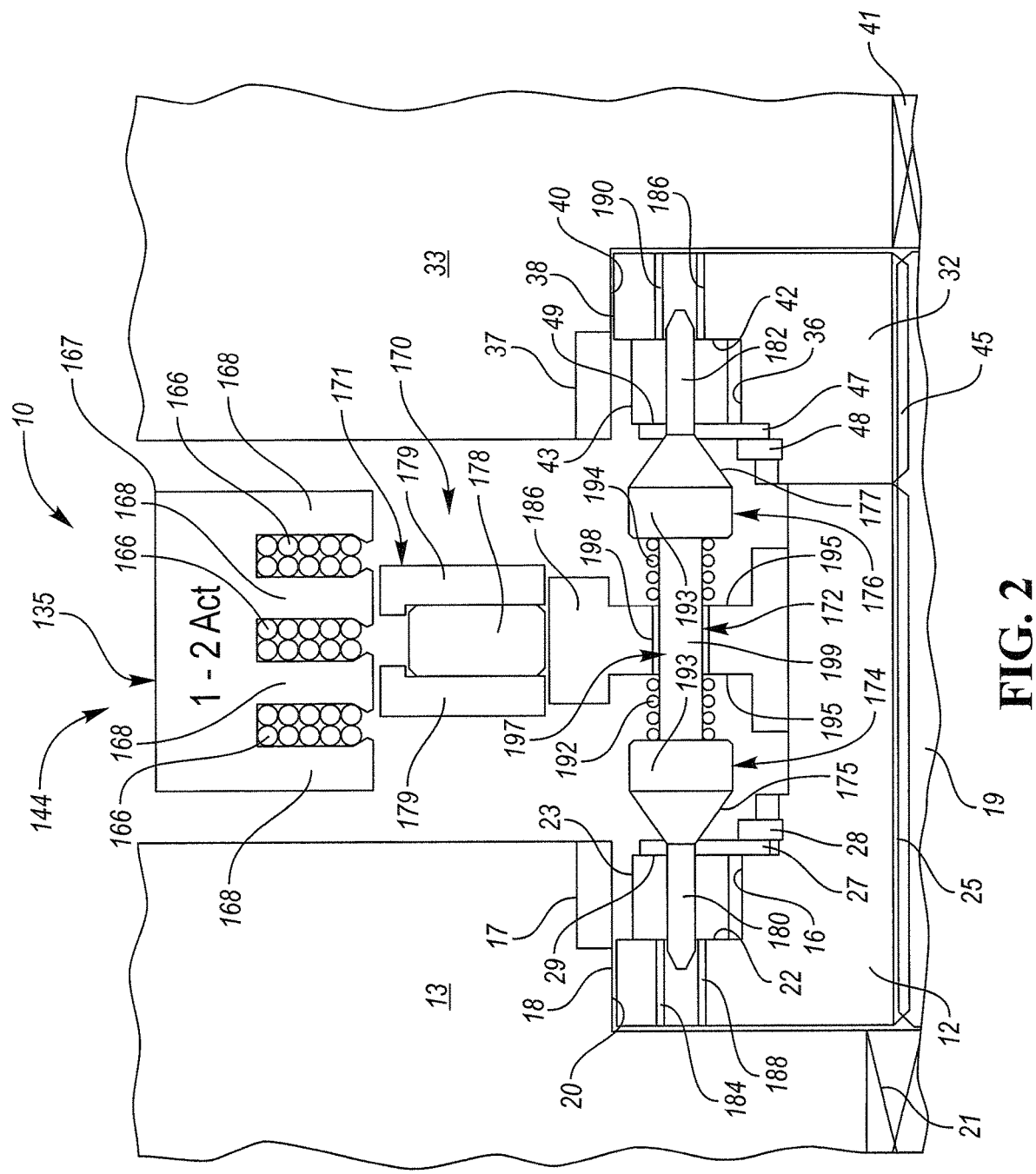
FIG. 2 is an enlarged view of the view of FIG. 1 to show details of the coupling and control assembly.

An overrunning, non-friction, radial coupling and control assembly constructed in accordance with at least one embodiment of the present invention is generally indicated at 10 in FIGS. 1 and 2. The assembly 10 preferably includes one or more radial, pawl-type clutch assemblies having bearing support.

The assembly 10 includes a first pair of coupling members 12 and 13. The member 12 is a pocket plate and the member 13 comprises a notch plate which is integrated with powdered metal first gear 11 which may be mounted for rotation with a shaft 14. The pocket plate has pockets 16 and the notch plate has notches 17. The members 12 and 13 are supported for rotation relative to one another about a common rotational axis 15 of an output shaft 19. The member 13 is supported for rotation on the shaft 19 by bearing 21. The coupling member 12 is splined to the output shaft 19 via splines 25 for rotation therewith.

First locking members or pawls 23 float freely in their pockets 16 and selectively mechanically couple the first pair of members 12 and 13 together upon engaging notches 17 to prevent relative rotation of the first pair of members 12 and 13 with respect to each other in at least one direction about the axis 15.

The assembly 10 also includes a second pair of coupling members 32 and 33 supported for rotation relative to one another about the common rotational axis 15 and second locking members or pawls 43 which float freely in their pockets 36 for selectively mechanically coupling the second pair of members 32 and 33 together to prevent relative rotation of the second pair of members 32 and 33 with respect to each other in at least one direction about the axis 15. A powdered metal second gear 31 is integrally formed with the member 33 and is mounted for rotation with the shaft 14. The member 33 is supported for rotation on the shaft 19 by bearings 41. The coupling member 32 is splined to the output shaft 19 via splines 45 for rotation therewith.

The inner plate-like members 12 and 32 have outer peripheral surfaces 18 and 38, respectively (FIG. 2). The outer plate-like members 13 and 33 have inner peripheral surfaces 20 and 40 adjacent the outer peripheral surface 18 and 38, respectively, in radially inner and radially outer relationship (FIG. 2). Each of the members 12 and 32 includes the pockets 16 and 36, respectively, angularly spaced about the axis 15. Each of the pockets 16 and 36 has a closed end 22 and 42, respectively, and an open end located axially opposite its closed end 22 or 42 (FIG. 2).

Each of the pawls 23 and 43 is located in its respective pocket 16 or 36 and is supported to pivot toward the inner peripheral surface 20 or 40 of its member 13 or 33. The pawls 23 and 43 are retained within their respective pockets 16 and 36 by plate-like bushings or retainers 27 and 47 which are secured to their respective member 12 or 32 via locking or snap rings 28 and 48. The retainers 27 and 47 partially cover the open ends of the pockets 16 and 36, respectively.

The inner and outer peripheral surfaces 20 and 18, respectively, define a first radial bearing interface adjacent the closed end 22 of each of the pockets 16. The retainer 27 has a bearing surface 29 which defines a bearing interface adjacent the open end of each of the pockets 16.

The inner and outer peripheral surfaces 40 and 38, respectively, define a second radial bearing interface adjacent the closed end 42 of each of the pockets 36. The retainer 47 has a bearing surface 49 which defines a bearing interface adjacent the open end of each of the pockets 36.

Figure 3:
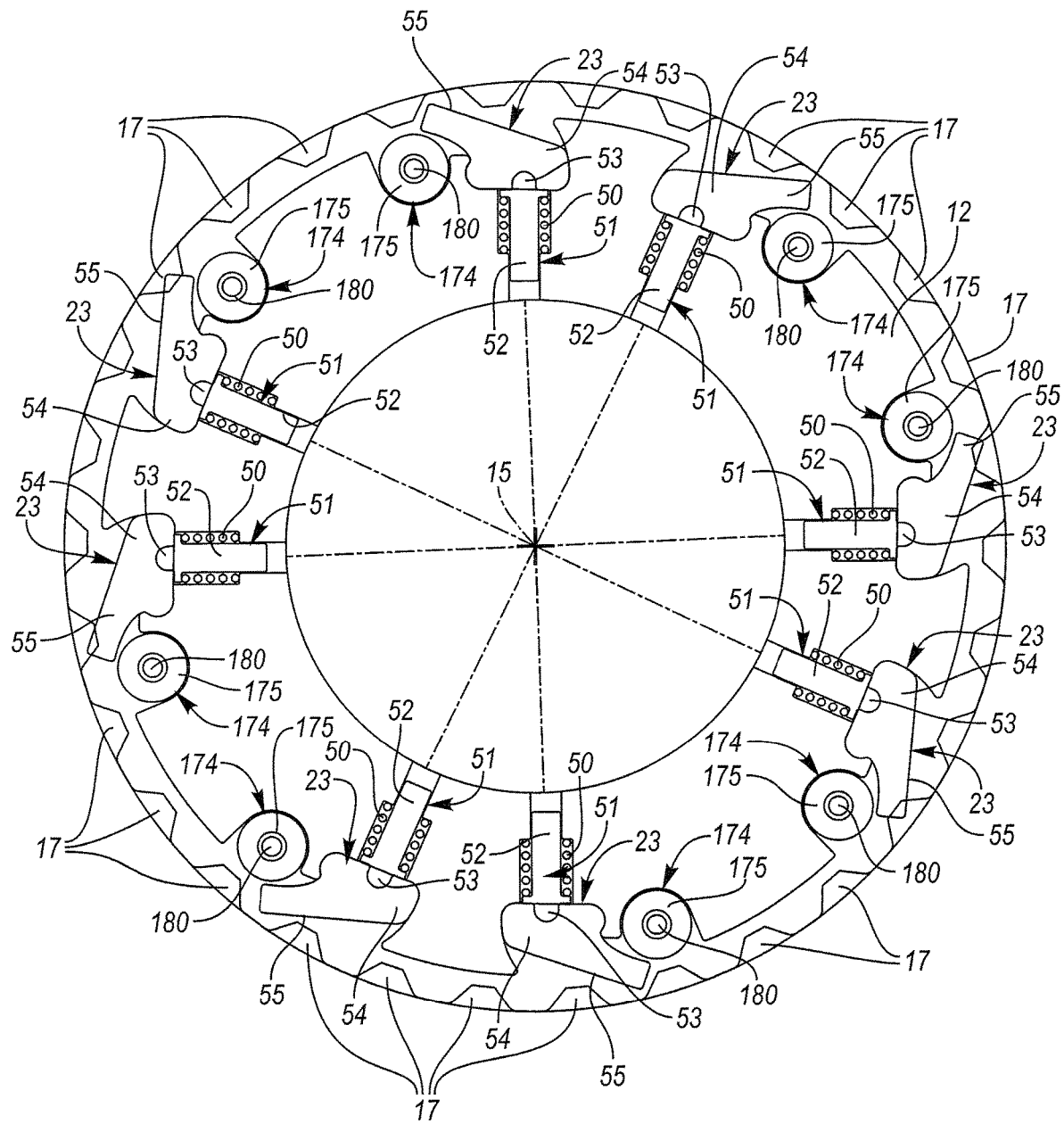
FIG. 3 is an end schematic view showing spring-biased, locking members or pawls in various pivotal positions including coupling and uncoupling positions as actuated by cam surfaces of cams.

As best shown in FIG. 3, assembly 10 includes sets of actuators, generally indicated at 51, including biasing members, such as springs 50. Each actuator 51 includes a sliding pin 52 having a head 53 received within an aperture formed in the lower surface of an end portion 54 of its respective pawl 23. An opposite end portion 55 of each pawl 23 is configured to engage the notches 17. Each of the biasing members 50 urges its respective pin 52 to move its respective pawl 23 toward the peripheral surface 20 of the member 13.

Referring again to FIGS. 1 and 2, the assembly 10 also includes a 3-position linear stepper motor, generally indicated at 144. The stepper motor 144 is typically controlled by a controller and includes the stator structure or subassembly 135 including at least one coil 166 (three shown) to create an electromagnetically switched magnetic field and to create a magnetic flux when the at least one coil 166 is energized.

The stepper motor 144 further includes a magnetically-latching translator structure or actuator subassembly, generally indicated at 170, including at least one bi-directionally movable connecting structure, such as a spring-biased rod or shaft, generally indicated at 172. Each rod 172 includes a pair of spaced apart, funnel-shaped cams 174 and 176, each of which has a contour surface 175 and 177, respectively, to cause the first and second locking members 23 and 43, respectively, to ride on their respective contour surfaces 175 and 177 to cause small-displacement, locking-member pivotal movement between coupling and uncoupling positions generally as shown in FIG. 3.

The actuator subassembly 170 further includes a magnetic actuator, generally indicated at 171, coupled to each rod 172 and mounted for controlled reciprocating movement along the rotational axis 15 relative to the first and second pairs of coupling members 12 and 13, and 32 and 33, respectively, between a first extended position which corresponds to a first mode of the first pair of coupling members 12 and 13 and a second extended position which corresponds to a second mode of the second pair of coupling members 32 and 33. The cam 174 actuates the first locking member 23 in its extended position, so that the first locking member 23 couples the first pair of coupling members 12 and 13 for rotation with each other in at least one direction about the rotational axis 15.

The cam 176 actuates the second locking member 43 to couple the second pair of coupling members 32 and 33 for rotation with each other in at least one direction about the rotational axis 15. The magnetic actuator 171 completes a path of the magnetic flux to magnetically latch in the first and second extended positions. A control force caused by the magnetic flux is applied to linearly move the magnetic actuator 171 between the first and second extended positions along the rotational axis 15.

The magnetic actuator 171 preferably includes a permanent magnet source 178 sandwiched between a pair of annular field redirection rings 179. The magnetic source 178 is preferably an annular, rare earth magnet which is axially magnetized.

In other words, the electromechanical apparatus or motor 144 controls the operating mode of a pair of coupling apparatus, each of which has drive and driven members supported for rotation relative to one another about the common rotational axis 15 of the output shaft 19. Each driven member may be the pocket plate 12 or 32 and the drive member may be the notch plate 13 or 33. Each coupling apparatus or assembly may include two or more rockers or pawls 23 or 43 for selectively mechanically coupling the members of each coupling assembly together and change the operating mode of each coupling assembly. Preferably, the rockers or pawls 23 and 43 are spaced at intervals about the axis 15 (i.e. FIG. 3).

The actuator subassembly 170 is configured or adapted for coupling with the members or plates of both of the coupling apparatus to rotate therewith. The subassembly 170 is supported on the output shaft 19 for rotation relative to the coils 166 about the rotational axis 15. The subassembly 170 typically includes two or more bi-directionally movable rods or shafts 172. Each stem portion 180 or 182 of its funnel-shaped cam 174 and 176, respectively, is adapted to slide within an aperture 184 or 186 in its respective coupling member during the selective, small-displacement, locking member pivotal movement. A bushing 188 or 190 may slidably support the stem portions 180 or 182, respectively, within the apertures 184 and 186.

The actuator 171 is operatively connected to the rods 172 for selective bi-directional shifting movement along the rotational axis 15 between a first position of the actuator 171 which corresponds to a mode (i.e. $1^{st}$ gear) of the first coupling apparatus (plate 12 and plate 13) and a second position of the actuator 171 which corresponds to a mode (i.e. $2^{nd}$ gear) of the coupling apparatus (plate 32 and plate 33). Two or more rods 172 may be spaced apart from one another as shown in FIG. 3. The different modes may be locked and unlocked (i.e. free wheeling) modes and may lock in one or both directions of rotary movement about the axis 15.

A first magnetic control force is applied to the actuator 171 when the at least one coil 166 is energized to cause the actuator 171 to move between its first, second, and neutral positions along the axis 15.

The actuator 171 includes a pair of spaced biasing spring members 192 and 194 for each rod 172 for exerting corresponding biasing forces on an I-shaped hub or support 196 in opposite directions along the axis 15 when the hub 196 moves between its first, second and third positions along the axis 15. The hub 196 has holes 197 for slideably receiving and supporting the connecting rods or shafts 172. When the support 196 moves, it pushes/pulls its respective springs 192 and 194 between opposite faces 195 of the support 196 and cylindrical portions 193 of the funnel-shaped cams 174 and 176.

The hub 196 rotates with the shaft 19 about the rotational axis 15. The hub 196 slideably supports interconnecting shaft portions 199 of the shafts 172 during corresponding shifting movement along the rotational axis 15 via bushings 198 mounted within the holes 197.

The member 12 may include spaced stops to define the extended positions of the actuator 171.

The actuator 171 also preferably includes a set of spaced guide pins (not shown) sandwiched between inner surface of the member 12 and an outer surface of the hub 196 and extending along the rotational axis 15. The inner surface and the outer surface may have V-shaped grooves or notches (not shown) formed therein to hold the guide pins. The hub 196 slides on the guide pins during shifting movement of the hub 196 along the rotational axis 15. The guide pins pilot the hub 196 on the member 12. The hub 196 may also distribute oil to the guide pins.

The stator subassembly 135 includes a ferromagnetic housing 167 having spaced apart fingers 168 and the electromagnetically inductive coils 166 housed between adjacent fingers 168.

The actuator 171 is an annular part having a magnetic annular ring 178 sandwiched between a pair of ferromagnetic backing rings 179. The magnetic control forces magnetically bias the fingers 168 and their corresponding backing rings 179 into alignment upon coil energization. These forces latch the actuator 171 in the two "on" or extended positions and the "off" or neutral position. The rings 179 are acted upon by the stator subassembly 135 to move the actuator 171.

Axial Translation Latching Force in the Permanent Magnet (PM) Linear Motor (taken from U.S. Pat. No. 9,435,387)

Consider the magnetic field line plot, also referred to as a magnetic flux line plot, shown in the cross sectional view of the subject linear motor structure in FIG. 13 of U.S. published application No. 2015/0014116. This is a circularly symmetric machine structure, with the translator axial movement direction shown in the x-direction, and the radial direction shown in the y-direction. The stator 24,28 cross section is a three iron tooth 72, two slot/coil 26 structure with the slot openings facing, across a radial air gap, the moving element or translator. The translator structure includes a single, axially-magnetized, rare earth PM ring 78 sandwiched between two iron field redirection rings 80. The sizing of the various components can be estimated from the scaling, given in meters, on the x and y axes. The magnetic field lines have been determined by a commercial magnetic finite element analysis (MFEA) software package. The solution shown in FIG. 13 is for the case of no coil current in the stator windings, and a translator axial position somewhat past, to the right of, the "neutral" or center position. The magnetic field lines, due to the translator magnet ring 78 alone, are seen to "flow" in closed paths with the majority of the lines flowing in a stator iron—air gap—translator iron/magnet circular path.

In general, the lines of force are confined to paths with a majority of iron content due to the ease of field production within the iron material. Examining the field lines that cross the air gap between the stator and the translator, a majority of them follow a path, from the translator iron redirection rings, up and to the right, to the iron teeth members in the stator. Thinking of the field lines as stretched rubber bands one would then expect a net force pulling the entire translator to the right. The actual sheer force density or x-directed sheer stress, again determined from MFEA analysis, at the axial directed mid-air gap line for this case is given in FIG. 14A of the above-noted published application. Shearing stress to both the right and the left is seen in FIG. 14A, which can be matched to the distribution of air gap field lines which "lean" to both the right and left along the air gap, but the total force (the integrated shear over the air gap x-directed extent) shows a net force on the translator to the right, for this particular translator position.

If one "sweeps" the translator position from left to right and recalculates the field lines at each position one can obtain a "slide show" of the magnetic field line production due to the translator position. When the translator structure is located to the left of the center or neutral position, the majority of the flux lines flow radially up and to the left of the translator position, so we expect a left directed force on the translator body. Conversely, as also shown in FIG. 13, when the translator structure is located to the right of the center position, the majority of flux line flow is radially up and to the right, so a right directed force on the translator body is expected. A plot of the actual total axial force on the translator body as a function of axial position, given in Newtons, is shown in FIG. 15A of the above-noted published application. If the translator is positioned to the right of center, it is pushed, due to its own magnetic field, to the right, and if positioned to the left of center, it is pushed further to the left. This is referred to as the "latching" action of the assembly. The exact center position, where the left-right pushing force exactly balances to zero, is an unstable equilibrium point, at which even minute movements will result in forces tending to push the translator away from the center position. The two other points shown, near the two axial ends of the stator structure, where the net translational force also passes through a zero value, are stable equilibrium points, where minute movements result in position restoring force production.

Axial Translation Force in the Permanent Magnet Linear Motor for the Case of Coil Current (taken from U.S. Pat. No. 7,435,387)

Consider the same machine structure as given in FIG. 13 but with the addition of a steady electrical current in the two stator windings. The solution for the magnetic field lines for this situation is shown in FIG. 16 of the above-mentioned application. A steady current, assumed uniformly distributed in the winding cross sections, is assumed to flow out of the page, toward the viewer in the wires of the coil in the slot on right side of the stator. The axial magnetization direction of the ring magnet did not matter in the pure latching force situation of FIG. 13 but it matters very much in this case of "dual" magnetic excitation. For the case shown, the magnet axial magnetization is stipulated to be to the right, in the plus x-direction, and therefore the direction or polarity of the magnetic lines of force closed "flow" path, due to the magnet alone, would be a counter clockwise circulation. The polarity direction of the circulating magnetic lines of force due to an electric current is given by the "right hand rule." If the thumb of one's right hand is made to point in the direction of the current flow in a wire, or a coil of wires, with the fingers encircling the cross section of the wire or the coil, the magnetic field lines or flux lines also encircle the wire or coil cross section and have a circulating direction in the same direction as the curling fingers.

In FIG. 16 the magnetic lines due the current in the left side coil alone then encircle this coil in the counter clockwise direction, while the magnetic lines due to the current in the right side coil encircle this coil in the clockwise direction. The net or total production of magnetic field lines, as shown in FIG. 16 is due to all three magnetic sources, the current in both coils and the translator magnet, so obviously there are regions in the machine structure where the individual sources of magnetic excitation enforce and add with each other and there are regions in the machine structure where the individual sources of magnetic excitation buck or subtract from each other. Since the coil current is reversible (plus or minus) the dual source enforcement and bucking regions within the machine structure and, most importantly, within the machine air gap, can be removed with respect to each other. This is the basis of the controllable/reversible direction linear motor disclosed herein.

The flow of the majority of the flux lines produced by the translator magnet alone resulted in a net force on the translator to the right for the given translator position shown in FIG. 13. But for the same translator position, with the addition of the coil currents, for the case shown in FIG. 16, the flow of the majority of the flux lines has shifted to a net encirclement of the left hand coil and the translator structure. So the majority of the flux lines now cross the air gap up and to the left with respect to the case confirms this and is shown in the plot of FIG. 17A of the above-noted published application. If the translator, by means of a "stop" was, previous to the introduction to translator magnet, introduction of coil current as in FIG. 16 would then overpower the latching force to the right and produce a net motoring force to the left, inducing the translator into left-directed motion. If the translator does move and subsequently crosses over the center or neutral position, the motoring or switching current can even then be removed, as the now left-directed latching force, due to the magnet alone, will enforce the remaining left movement to a similar off-state latching position to the left of the center or neutral position. The net axial separation between the two latched positions on the left and right of the center position is then said to be the "stroke" length of the machine.

A slide show set of solutions for the total magnetic field lines within the linear motor structure with the same coil current drive as in the case shown in FIG. 16, as a function of the axial position of the translator, similar to that given for the previous case of magnet excitation alone, show that for the level of coil current assumed the net force on the translator structure is always to the left, no matter the assumed value of the translator position.

Finally, the magnetic field and axial sheer stress solutions for the case of coil current aiding drive, that is drive in the direction of the magnet latching force, are given in FIGS. 18 and 19A, respectively of the above-noted published application. The polarity of the coil currents for the case of FIGS. 18 and 19A are simply reversed from that of the case shown in FIGS. 16 and 17A, the translator position is the same as in the case of FIGS. 16 and 17A. In this case, coil current drives in the direction of the magnet latching force, when the translator position has moved to the left of the center position.

Figure 4:
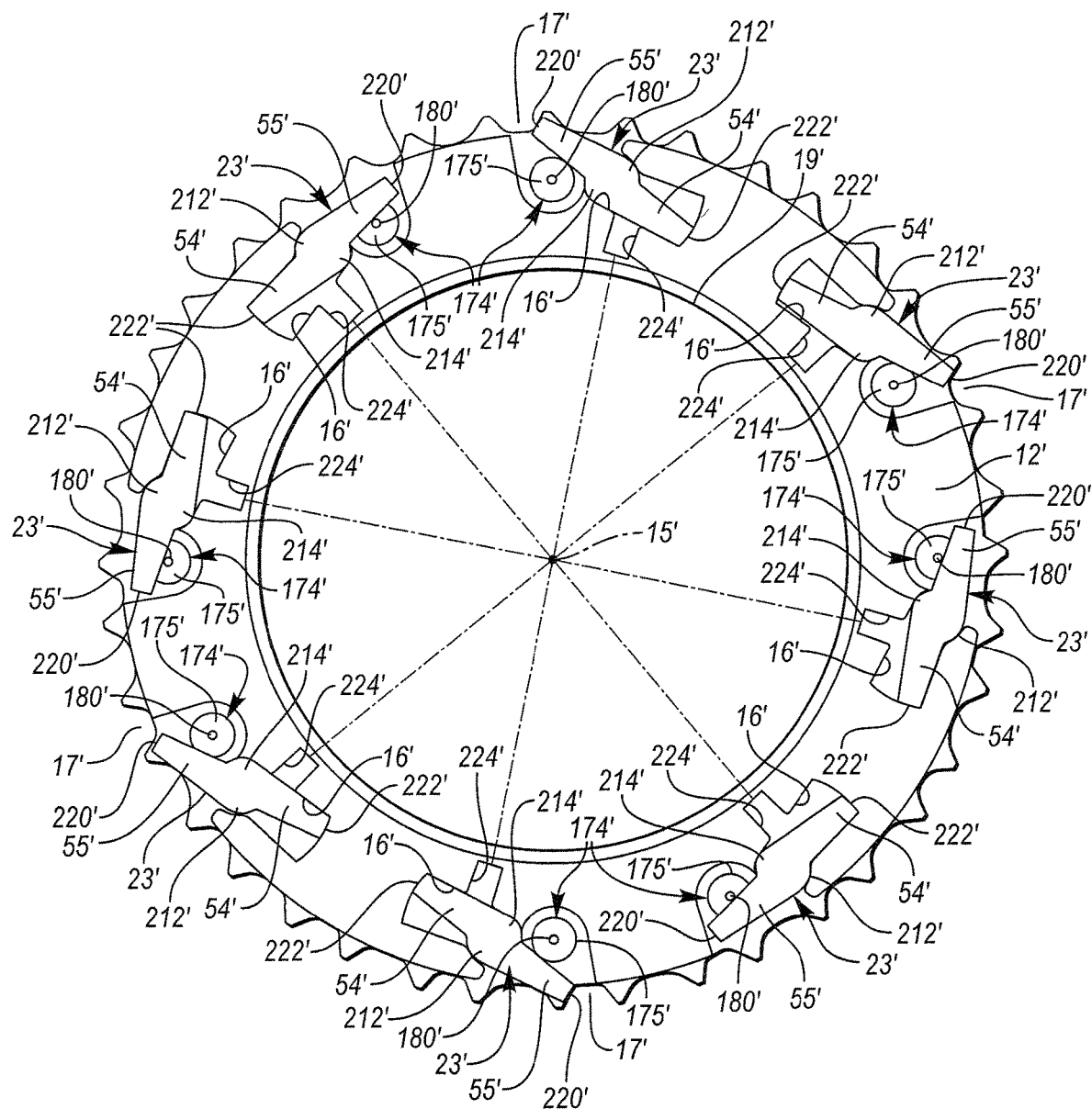
FIG. 4 is an end schematic view of a second embodiment with locking members or pawls in various pivotal positions including coupling and uncoupling positions as actuated by cam surfaces of cams.
Figure 5:
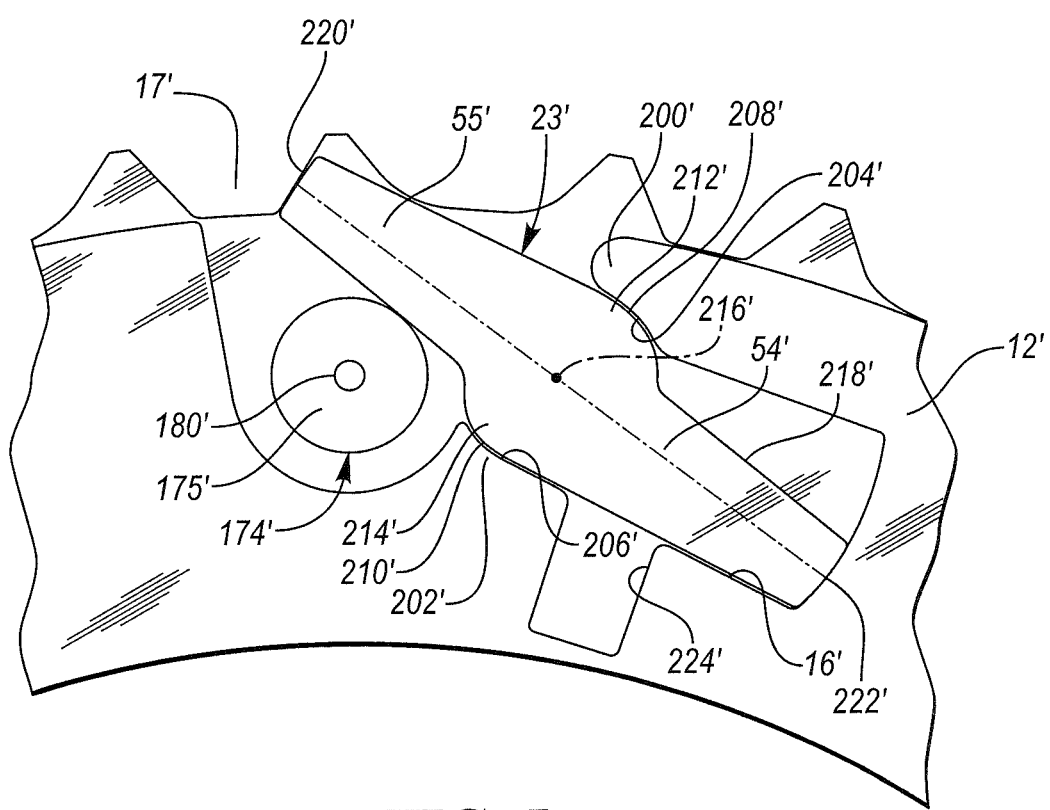
FIG. 5 is an enlarged side view, partially broken away, of one of the locking members or cams of FIG. 4 in its coupling position as actuated by a cam surface of a cam.

Referring now to FIGS. 4 and 5, there is illustrated another embodiment of a first coupling member 12', notches 17' of a second coupling member (not shown) and locking members or pawls 23', which are received and retained with pockets 16' formed within a coupling face of the coupling member 12'. Parts of the second embodiment which are the same or similar to parts of the first embodiment have the same reference numeral but a single prime designation.

The second embodiment of the overrunning, non-friction radial coupling and control assembly has substantially the same parts as the first embodiment except for the parts having a single prime designation. The assembly preferably includes one or more radial, pawl-type clutch assemblies having bearing support.

The coupling and control assembly of the second embodiment includes the first coupling member or pocket plate 12' and a second coupling member or notch plate which, as previously mentioned, is not shown in its entirety but rather its notches 17' are shown for purposes of simplicity. The first and second members or plates are supported on rotation relative to one another about a common rotational axis 15' of an output shaft 19'. The second member is supported for rotation on the shaft 19' by bearings (not shown) and the first member 12' is splined to the output shaft 19' via splines (not shown) for rotation therewith.

The locking members or pawls 23' are pivotally supported within their respective pockets 16' by upper and lower cup or socket portions 200' and 202' of the pocket plate 12'. Each of the socket portions 200' and 202' has a concave bearing surface 204' and 206', respectively, adapted to fit against corresponding bearing surfaces 208' and 210', respectively, of projecting, convex, upper and lower pivots 212' and 214', respectively, of the locking member 23'. Preferably, the pivots 212' and 214' provide a smooth, bulbous, bearing surface for the locking member 23' as it pivots about its pivot axis 216' between its engaged and disengaged positions with respect to the coupling members or plates so that one-way torque transfer can occur between the coupling members.

The upper and lower pivots 212' and 214', respectively, extend from a main body portion 218' of the locking member 23'. The main body portion 218' extends between a member-engaging, first end surface 220' and a member-engaging, second end surface 222'.

A centroid or center of mass (i.e. gravity) is substantially centered on the pivot axis 216' so that the locking member 23' is substantially centrifugally neutral or balanced. Centrifugal force acts upon the centroid of the locking member 23' upon rotation of the pocket plate 12'. The pivot axis 216' is located substantially at the midpoint between the first and second end surfaces 220' and 222'. If the locking member 23' was not substantially centrifugally neutral or balanced, the force needed to rotate the locking member 23' would be high at high rotational speeds such as 10,000 RPM. While it is possible to counteract the locking member imbalance issue, such measures are oftentimes impractical. By making the centroid or center of mass of the locking member 23' lie on the axis of rotation 216' within its pocket 16', the locking member 16' becomes substantially contrifugally neutral or balanced thereby making the one-way clutch lighter and more compact.

One or more biasing members such as springs (not shown) are disposed in recesses 224' formed in their respective pockets 16' to bias end portions 54' of their respective locking members 23' and thereby urge the locking members 23' into their respective pockets 16' in their disengaged positions. The spring forces operate against the camming forces of the cams 174' as the underside of the opposite end portions of the locking members 23' ride on the contour surfaces 175'. As in the first embodiment, a stem portion 180' of the funnel-shaped cam 174' is adapted to slide within an aperture (not shown in FIGS. 4 and 5) in the pocket plate 12' during locking member pivotal movement.

As eCMDs become more accepted as a feasible technology for Advanced Hybrids and EVs, the specifications and requirements for the clutches is rapidly increasing. The nature of E-motors is high torque at zero/low speed with the capability of spinning 3 times faster than a tradition ICE application. eCMDs need to be able to turn ON and OFF at speeds of at least 15,000 RPM. The formula for the radial force generated by rotation is $$F_c = MV^2/r$$

So the radial force is increased at the square of velocity. So an example from a design of the strut in a clutch that weighs 4.17 grams at a speed of 15,000 RPM translates into a radial force of the strut in its pocket of 151 lbs. These are the new realities that eCMD designers are now faced with. The control system (electro-mechanical portion) of the eCMD must be able to rotate the strut in the presence of these huge radial forces. These radial forces are not reacted by the outer wall of the pocket plate. A frictional force is generated that creates an opposing moment to the desired rotation of the strut. The frictional force equation (formula) is $$F_f = \mu N \text{ where } N = F_c \text{ and } \mu = \text{coefficient of friction}$$

The opposing moment equation is $$M = F_f r$$

Where r=the moment arm which is the distance from the pivot point to the point of contact of the strut to the pocket.

The lower the value of M, the easier it is for the electro-mechanical portion of the eCMD to rotate the strut. So for a given speed of the clutch the parameters that can be manipulated to reduce the moment are Mass of the strut, the value of μ and the length of the moment arm. The following description is released to the embodiment of FIGS. 6 and 7 and its objective to reduce the moment arm.

Figure 6:
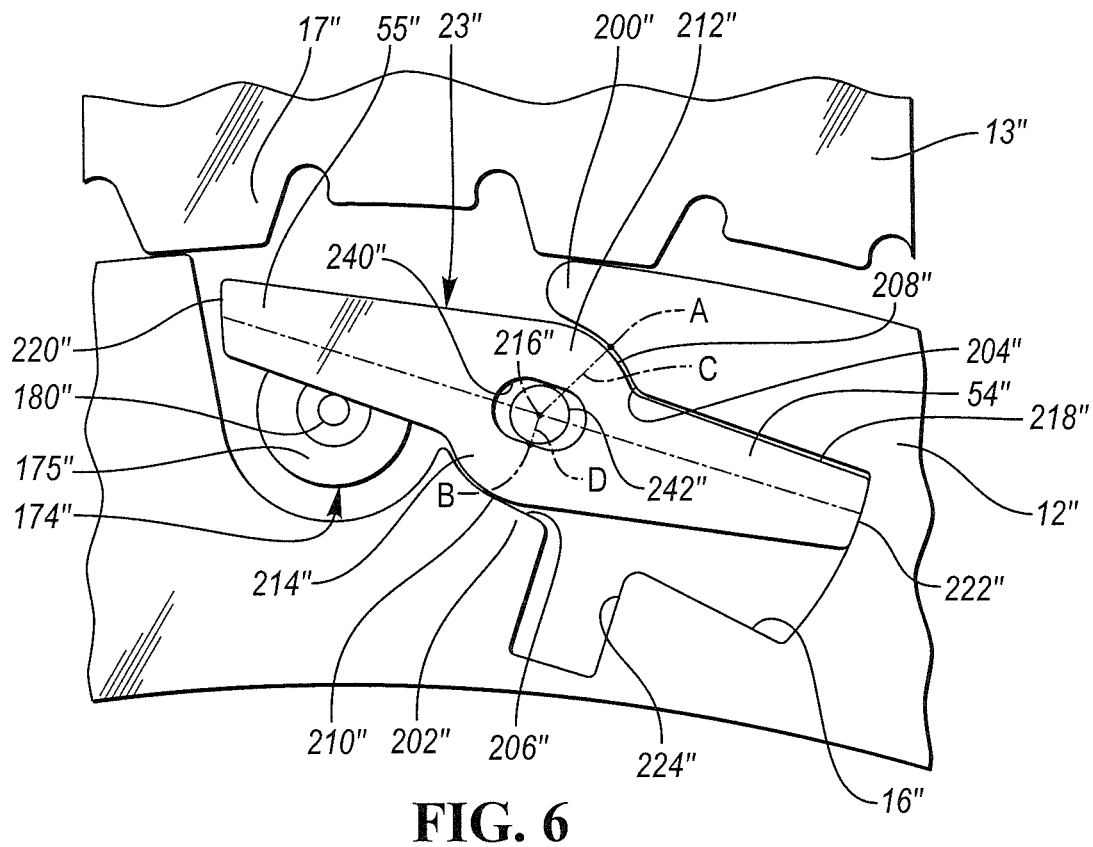
FIG. 6 is an enlarged side view, partially broken away, of another embodiment of one of the locking members or cams in its uncoupling position.
Figure 7:
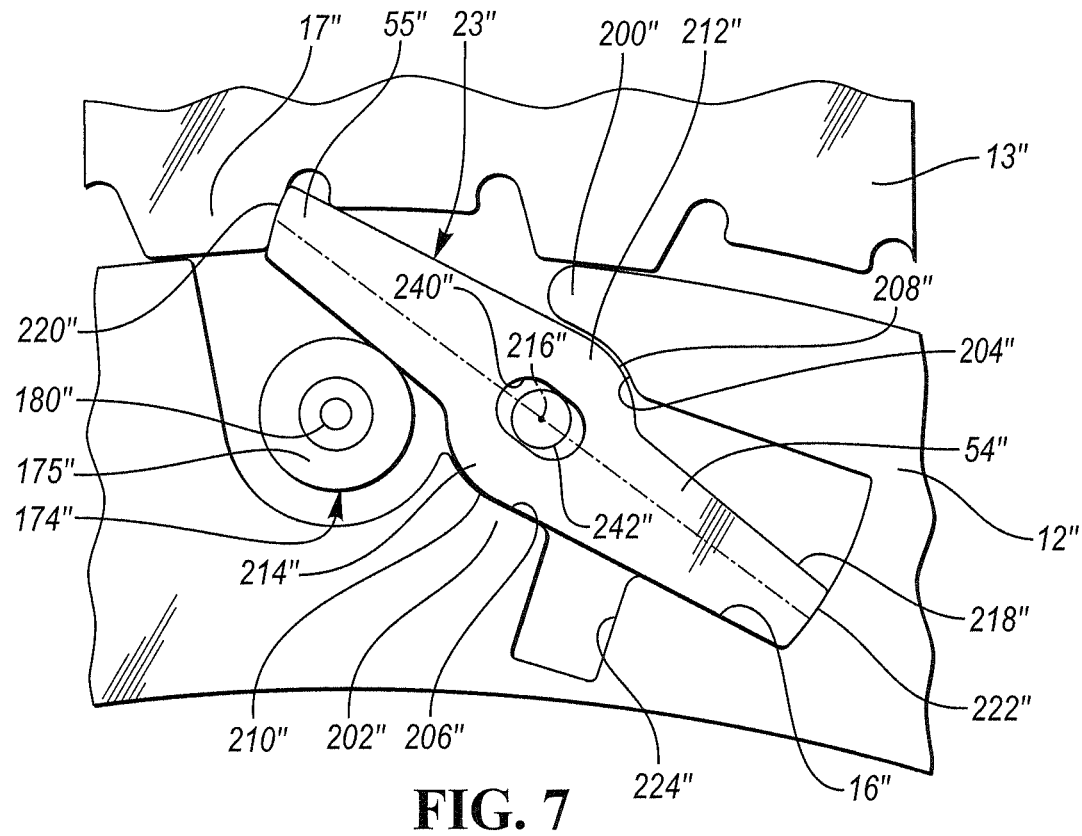
FIG. 7 is a view similar to the view of FIG. 6 but with the locking member in its coupling position as actuated by a cam surface of cam.

Referring now to FIGS. 6 and 7, there is illustrated yet another embodiment of a first coupling member 12", notches 17" of a second coupling member 13" and a locking member or pawl 23" which is received and retained within a pocket 16" formed within a coupling face of the coupling member 12". Parts of the third embodiment which are the same or similar to parts of the first and second embodiments, have the same reference number but a double prime designation.

The third embodiment of the overrunning, non-friction radial coupling and control assembly has substantially the same parts as the first and second embodiments except for the parts having a double prime designation. The assembly preferably includes one or more radial, pawl-type clutch assemblies having bearing support.

The coupling and control assembly of the third embodiment includes the first coupling member or pocket plate 12" and the second coupling member or notch plate 13" which, as previously mentioned, is not shown in its entirety but rather its notches 17" are shown for purposes of simplicity. The first and second members or plates are supported on rotation relative to one another about a common rotational axis of an output shaft (not shown). The second member is supported for rotation on the shaft by bearings (not shown) and the first member 12" is splined to the output shaft via splines (not shown) for rotation therewith.

The locking member or pawl 23" is supported within its pocket 16" by upper and lower cup or socket portions 200" and 202" of the pocket plate 12". The socket portion 202" has a concave bearing surface 206", adapted to fit against corresponding bearing surface 210", of a projecting, convex, lower pivot 214" of the locking member 23". Preferably, the pivot 214" provides a smooth, bulbous, bearing surface of the locking member 23" as it pivots about its pivot axis 216" between its engaged and disengaged positions with respect to the coupling members or plates so that one-way torque transfer can occur between the coupling members.

The design of FIGS. 6 and 7 show a modification to the radial strut and the pocket of FIGS. 4 and 5. The radial strut is 23" is a MIM part with a formed oval hole 240" centered about the centroid of the strut. The pocket plate has a pressed in hardened and polished pin 242" of a diameter of approximately 2 mm. The width of slot in the oval hold is approximately 2.2 mm. If the pin 242" was not present, the contact of the radial strut would occur at point A with a moment arm of C. With the pin 242" present, the sliding contact occurs at point B with a moment arm of D. The advantage is that D is much shorter than C, then M is reduced linearly with the reduction of length of the moment arm.

The radial strut 23" and pin 242" could both be coated with a friction reducing coating like Teflon that reduces The reason the pin 242" is not a tight fit to a hole in the radial strut 23" is because when the strut 23" is locked and carrying load, there must be clearance to the pin 242". The function of the point 242" is to provide a reaction point when transitioning from OFF to ON and ON to OFF. It should not be loaded beyond the load from the radial force generated by rotation, hence the oval clearance hole 240".

The lower pivot 214" extends from a main body portion 218" of the locking member 23". The main body portion 218" extends between a member-engaging, first end surface 220" and a member-engaging, second end surface 222".

A centroid or center of mass (i.e. gravity) is substantially centered on the pivot axis 216" so that the locking member 23" is substantially centrifugally neutral or balanced. Centrifugal force acts upon the centroid of the locking member 23" upon rotation of the pocket plate 12". The pivot axis 216" is located substantially at the midpoint between the first and second end surfaces 220" and 222". If the locking member 23" is substantially centrifugally neutral or balanced, the force needed to rotate the locking member 23" is high at high rotational speeds such as 10,000 RPM. While it is possible to counteract the locking member imbalance issue, such measures are oftentimes impractical. By making the centroid or center of mass of the locking member 23" lie on the axis of rotation 216" within its pocket 16", the locking member 23" becomes substantially centripugally neutral or balanced thereby making the one-way clutch lighter and more compact.

One or more biasing members such as springs (not shown) are disposed in a recess 224" formed in its pockets 16" to bias end portions 54" of the locking member 23" and thereby urge the locking member 23" into its pockets 16" in its disengaged positions. The spring force operates against the camming forces of the cam 174" as the underside of the opposite end portions of the locking member 23" ride on the contour surface 175". As in the first embodiment, a stem portion 180" of the funnel-shaped cam 174" is adapted to slide within an aperture (not shown in FIGS. 6 and 7) in the pocket plate 12" during locking member pivotal movement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engageable coupling assembly comprising:
   first and second coupling members, the first coupling member having a coupling face with a pocket which is sized and shaped to receive and nominally retain a locking member, the locking member including:
   a member-engaging first end surface;
   a member-engaging second end surface; and
   an elongated main body portion between the end surfaces, the main body portion being configured to enable pivotal motion of the locking member about a pivot axis, the end surfaces of the locking member being movable between engaged and disengaged positions with respect to the coupling members during the pivotal motion whereby one-way torque transfer may occur between the coupling members and wherein a centroid or center of mass of the locking member is substantially centered on the pivot axis so that the locking member is substantially centrifugally neutral or balanced, thereby reducing overall moment on the locking member about the pivot axis that has to be overcome to move the locking member between the engaged and disengaged positions wherein the assembly further comprises a pivot pin supported by the first coupling member in the pocket, wherein the main body portion includes an aperture centered about the centroid and adapted to receive the pivot pin to enable the pivotal motion, the first coupling member being adapted to be coupled to the locking member via the pivot pin.

2. The assembly as claimed in claim 1, wherein the main body portion includes projecting upper and lower pivots to enable the pivotal motion.

3. The assembly as claimed in claim 1, wherein the aperture is an oblong aperture which receives the pivot pin to allow both pivotal and translational motion of the locking member.

4. The assembly as claimed in claim 1, further comprising a friction-reducing coating to reduce overall moment on the locking member about the pivot axis.

5. An overrunning coupling and control assembly comprising:
   first and second coupling members, the first coupling member having a first face with a pocket which is sized and shaped to receive and nominally retain a locking member and a second face having a passage in communication with the pocket to communicate an actuating force to the locking member to actuate the locking member within the pocket so that the locking member moves between the engaged and disengaged positions, the locking member including:
   a member-engaging first end surface;
   a member-engaging second end surface; and
   an elongated main body portion between the end surfaces, the main body portion being configured to enable pivotal motion of the locking member about a pivot axis, the end surfaces of the locking member being movable between engaged and disengaged positions with respect to the coupling members during the pivotal motion whereby one-way torque transfer may occur between the coupling members and wherein a centroid of the locking member is substantially centered on the pivot axis so that the locking member is substantially centrifugally centered or balanced, thereby reducing overall moment on the locking member about the pivot axis that has to be overcome to move the locking member between the engaged and disengaged positions.

6. The assembly as claimed in claim 5 wherein the main body portion includes projecting upper and lower pivots to enable the pivotal motion.

7. The assembly as claimed in claim 5 further compromising a pivot pin supported by the first coupling member in the pocket wherein the main body portion includes an aperture centered about the centroid that receives the pivot pin to enable the pivotal motion.

8. The assembly as claimed in claim 7, wherein the aperture is an oblong aperture which receives the pivot pin to allow both pivotal and translational motion of the locking member.

9. The assembly as claimed in claim 5, further compromising a friction-reducing coating to reduce overall moment on the locking member about the pivot axis.

10. The assembly as claimed in claim 5, further comprising an actuator received within the passage to provide the actuating force.

* * * * *